Feb. 11, 1941.  C. H. PETERSON  2,231,679
CONSTANT VOLTAGE GENERATOR
Filed Sept. 26, 1938  2 Sheets-Sheet 1

INVENTOR
Charles H. Peterson
BY
Wooster & Davis
ATTORNEYS

Patented Feb. 11, 1941

2,231,679

UNITED STATES PATENT OFFICE 2,231,679

CONSTANT VOLTAGE GENERATOR

Charles H. Peterson, East Norwalk, Conn.

Application September 26, 1938, Serial No. 231,682

2 Claims. (Cl. 171—314)

This invention relates to electric generators, particularly to a compound wound dynamo or generator, and has for an object to provide a generator which will automaticaly maintain the voltage within small variations with variations in the load, and particularly to provide means to counteract the residual magnetism in the magnetic circuit to prevent objectionable increase in voltage with a decreasing load.

Thus it is an object of the invention to produce a generator which will inherently adjust its voltage to a predetermined value, and which will follow the load requirements instantaneously.

With the foregoing and other objects in view I have devised an arrangement for a generator as illustrated in the accompanying drawings forming a part of this specification.

My improved generator is intended primarily for use in supplying power for telephone operation as the voltage may be maintained constant within the very close limits which is desired for such service, but of course is not confined to such use but may be employed in any system where similar conditions are to be met.

Figure 2:
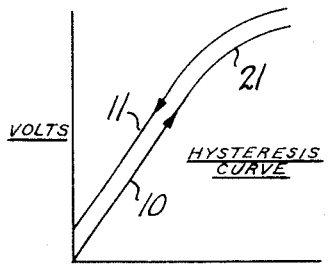
Fig. 2 illustrates the difference in the magnetization curves of the field magnets when plotted with values secured when the exciting current is gradually increased from zero to a maximum and then gradually reduced from this maximum back to zero.

As is well known the form of the magnetization curve for the magnetic circuit of a generator obtained experimentally is not the same if the exciting current in the field winding is first gradually increased from zero to a maximum, and then gradually reduced from this maximum back to zero. The observed readings when plotted take the forms of curves shown in Fig. 2, where curve 10 represents the results on gradually increasing the exciting current from zero to a maximum, and curve 11 the results on a decreasing current from this maximum back to zero. The difference between the two curves is due to the hysteresis of the iron part of the magnetic circuit, hysteresis being the name given to that property of iron (or other magnetic substance) by virtue of which the induced magnetism lags behind changes in the magnetizing force.

The load characteristic of a generator is a curve showing the relation between terminal voltage (as ordinates) and field excitation (as abscissa) subject to the condition that the current supplied to the load is constant. If this load current happens to be zero the curve becomes the no load characteristic or the magnetization curve 10. In the case of a generator the terminal voltage at full load is generally different from that at no load. The difference between the two values is then a measure of the closeness with which the machine regulates for constant voltage. The difference is called the voltage regulation.

The compound generator is essentially a shunt or separately excited generator with the field circuit augmented by a coil in series with the armature circuit and the load. Under no load conditions the generated E. M. F. is dependent upon the excitation of the shunt field, but under load the armature or load current passes through the series field thereby adding to the magneto motive force of the fiield circuit, and as a result causing a greater amount of magnetic flux to flow through the field magnetic circuit. Since the terminal voltage of a generator is equal to the generated voltage minus the IR drop within the armature circuit, it is necessary to raise the value of the generated voltage in order to maintain constant terminal voltage with an increase in load. There is also another factor which must be given cognizance in discussing a generator under load, and that is armature reaction. With a separately excited shunt generator what is called "practically constant voltage" is obtained, but even with this designation there may be a variation of 10% from no load to full load. In some cases this 10% variation of voltage is undesirable and it is necessary to provide means whereby the terminal voltage may be kept constant within 1%. In other cases it is desired to keep the voltage constant at some remote point. On occasions of this type the terminal voltage must be increased under load in order to compensate for the IR drop to the remote point of distribution.

In so far as constant terminal voltage is concerned, this may be obtained from a separately excited generator by the use of a regulator which controls the current through the field circuit. Terminal voltage control may also be obtained through manual regulation of the field current in a shunt or separately excited generator. These means of terminal voltage regulation do not commend themselves in comparison to the simplicity of a compound wound generator which does not require manual regulation, and does not possess a multitude of fine and delicate parts, but regulates itself through the magnetic effect caused by its load current. The control is electrical and magnetic and therefore is not dependent upon mechanical contrivances or manual devices.

The characteristics of a generator are dependent upon ($p$) number of poles (field); ($a$) number of magnetic paths in parallel; ($Q$) magnetic flux; ($Z$) number of armature conductors; and ($N$) number of revolutions per minute. When a machine is once built the factors ($p$), ($a$) and ($Z$) are fixed quantities. They must therefore be eliminated in considering a means of voltage regulation. There are left, however, two other factors which provide ready and easy means of voltage regulation, namely ($Q$) and ($N$) (flux and speed). If we consider a shunt generator the flux or speed regulation will require either manual control or complicated apparatus to regulate for constant voltage with load, since as previously stated, the terminal voltage of a shunt or separately excited generator decreases with load on account of IR (armature) drop and armature reaction. Since speed regulation will require manual control or use of complicated apparatus there is only one factor left with which to work i. e. ($Q$) (flux).

The flux ($Q$) in any magnetic circuit is dependent upon the magneto motive force and the reluctance of the magnetic circuit. The reluctance of a magnetic circuit is not a straight line element but one that varies with the degree of saturation. Therefore in order to find the resulting flux for a certain value of magneto motive force reference must be had to a BH or iron magnetic saturation curve. The magneto motive force in a magnetic circuit is equal to KNI where K is a constant dependent upon the length and area of the magnetic circuit, N is number of turns of wire, and I equals the current through the turns of wire.

The compound generator when properly designed will automatically keep the voltage constant as the load increases, but will not do so as the load decreases because of the residual magnetism in the poles.

Figure 1:
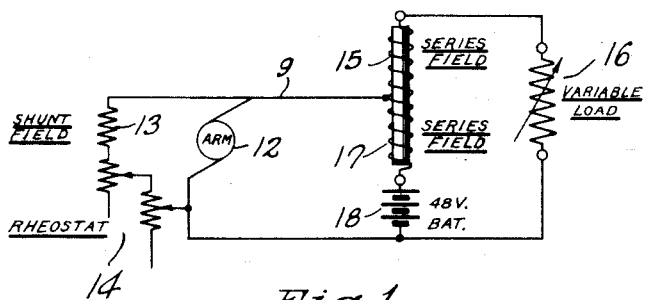
Fig. 1 is a wiring diagram for a generator constructed according to this invention.

I overcome this latter difficulty as shown in Fig. 1. In this figure is shown diagrammatically the wiring for a compound generator comprising the armature 12, the shunt field 13, which may be provided with an adjustable rheostat 14, and the series field coil 15 wound in the same sense as shunt coil 13 and connected in series with the armature 12 and the variable load 16. To maintain the voltage constant on decreasing load I provide a second series field 17 connected across the armature and with a storage battery 18 in series with this coil. This second series field 17 is wound in a sense to counteract or oppose the flux of series coil 15 when current is flowing through coil 17 toward the battery 18 or charging it. It will thus assist coil 15 when the battery is discharging. It preferably has the same number of turns as coil 15, and counteracts the residual magnetism in the magnetic circuit as the load decreases as will be described presently. Coils 15 and 17 may comprise a single continuously wound coil connected at its center by a lead 9 with the armature. The normal voltage of battery 18 is the same as the normal voltage it is desired to maintain on the load circuit.

It will be seen the new generator is essentially a "short shunt compound generator" with a third field coil arranged to act as a counter magneto motive force to oppose the residual magnetism occasioned by load conditions, and it is further arranged to permit the connection of a battery in series with the counter coil across the armature.

As an example for illustration it will be assumed it is desired to maintain a voltage of 49.5 volts as in telephone operation. The battery 18 will be a 23 cell battery, and although a voltage of 2.15 volts per cell, or 49.45 volts for a 23 cell battery is desired, the battery companies permit a ±½ volt variation in a 23 cell installation i. e. 49 to 50 volt range. The shunt field rheostat 14 is set to provide a no load voltage of 49.5 volts. On closing of the circuit to the load and battery, if the battery is below 49.5 volts a charging current will be established which will vary to a limit of zero as the battery voltage approaches 49.5 volts.

With the application of load the battery discharges slightly increasing the field magnetization through the series field until the generator voltage equals the battery voltage at which time the generator assumes the entire load. With increasing load this cycle repeats until a capacity condition is reached at which time the battery assumes a portion of the load. The capacity of the machine may be varied between maximum load requirements and full load capacity. It appears that this machine capacity should equal the average busy hour load requirement beyond which the battery should assume the remaining load.

A decreasing load will increase the resulting generator voltage, which will be dissipated partially through the load and the remainder through a battery charge. The final voltage will be the net voltage of that occasioned by the residual magnetism minus the counter electro motive force of the battery series field 17. On a 23 cell battery installation the battery series field should therefore be shunted so that the maximum voltage is 50 volts.

If the battery 18 is discharged partially or completely the charging will be continued as a result of the shunt field setting until the voltage of the battery is 49.5 volts. The charging rate will be regulated by the difference of the generator voltage occasioned by the shunt field 13 minus the effect of the battery series field 17 and the battery voltage. The resulting tapering charge will provide a better battery condition than a high charging rate since it permits a greater penetration of the charge into the battery elements.

It is important for proper constant voltage regulation that the speed of the prime mover should be reasonably constant. During normal operation (normal voltage) practically no current flows through the suppressing coil 17. On decreasing load current flows through this coil toward the battery 18 tending to depress the residual magnetism and also giving slight charging of battery, which replaces what discharge might have occurred and also compensates for internal losses of battery. On normal or overloads there is practically no discharge from the battery. The battery takes the load only on failure of the generator, and aids generator in assuming an instantaneous heavy load and also standby power in case of generator failure.

Figure 3:
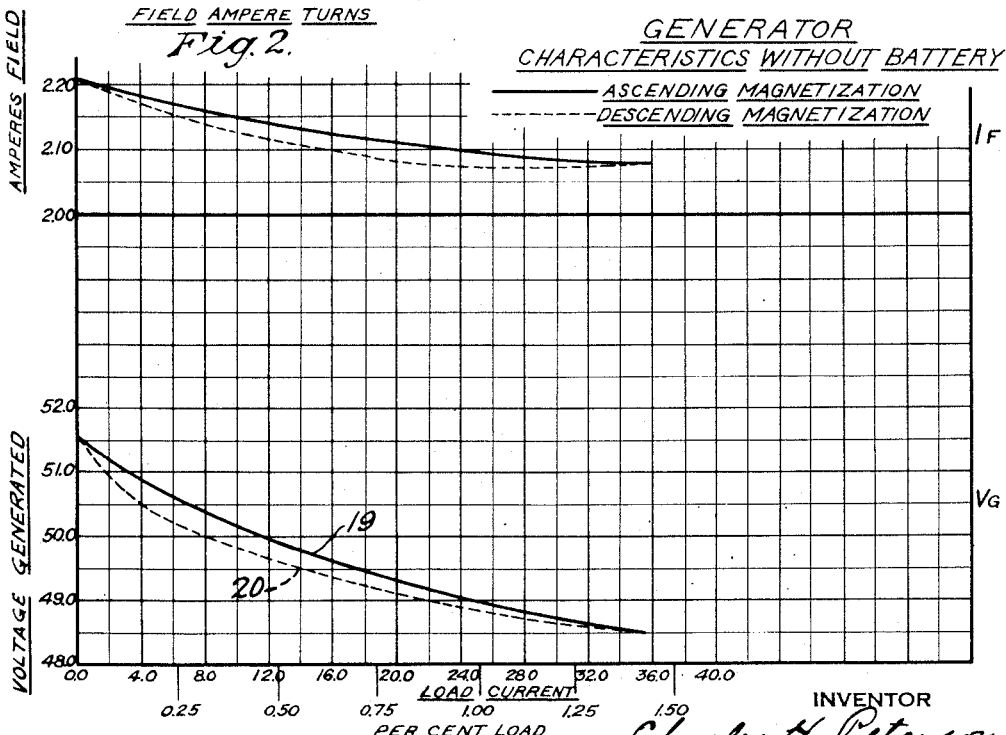
Fig. 3 are curves showing characteristics of the generator when used without the storage battery.

The generator may be operated as a compound generator without a battery. That is the battery 18 can be taken out and the system will function, but there will be a greater voltage variation than when the battery is used. This is shown by the curves 19 and 20 in Fig. 3.

It was found that for the above conditions it was necessary to design and construct a generator yoke and pole assembly which would have a magnetization characteristic with a bend of appreciable proportions at approximately 49.5 volts so that the field setting for that particular voltage would be definitely peculiar to that voltage. That is, the bend in the magnetization curve indicated at 21 Fig. 2 should begin somewhat below normal voltage. In other words the generator should be provided with a magnetic circuit whose characteristic at the desired voltage will have a decided bend.

For best results it should be provided with a slotted armature to decrease the effective air gap between the poles and armature. This will have the effect of decreasing the required field current and in addition more readily obtain the desired bend to the magnetic characteristic. The series fields 15 and 17 should be of about equal number of turns. It should also be provided with an overload device so as to limit the output of the machine to say 100% overload. The control can be obtained by automatically inserting a suitable resistance in series with the shunt field.

This generator will establish itself at a predetemined voltage and provide a source of constant voltage within commercial limits, utilizing a magnetic means within the generator design to control its voltage. It will assume all load changes in large or small steps instantaneously, and will maintain its voltage within 1 volt at full load. It will immediately upon a change of load, eliminate the lag occasioned by external control equipment. It will maintain its no load voltage within about 1 volt.

It will recharge the associated battery up to a predetermined value if the battery has been completely or partly discharged for any reason whatsoever. A complete discharge may be occasioned by a power failure while a partial discharge may be occasioned by a load in excess of machine capacity. It will also compensate for inherent battery losses caused by local action. The desired voltage at which a battery should be maintained under constant float conditions is 2.15 volts per cell. As is well known a change in the amount of charge contained in a battery is reflected in its voltage. This generator will replace the charge lost by local action or other activity and restore the cell to its desired condition at 2.15 volts. In the example given it will charge the associated 23 cell battery until its voltage reaches the desired approximately 49.5 volts ±0.5 volt.

In telephone use it will permit the provision of telephone power on a machine basis using a secondary prime mover for emergency power. This will permit a reduction in the storage battery to a size which will serve as a transient filter and a short-period change-over power supply, thus reducing the initial battery expense. It will increase the life of the associated pasted plate battery from 4½ to 8 years, thus decreasing storage battery replacement costs approximately 45%, or increase the life of the associated Manchester type battery a corresponding amount.

Figure 4:
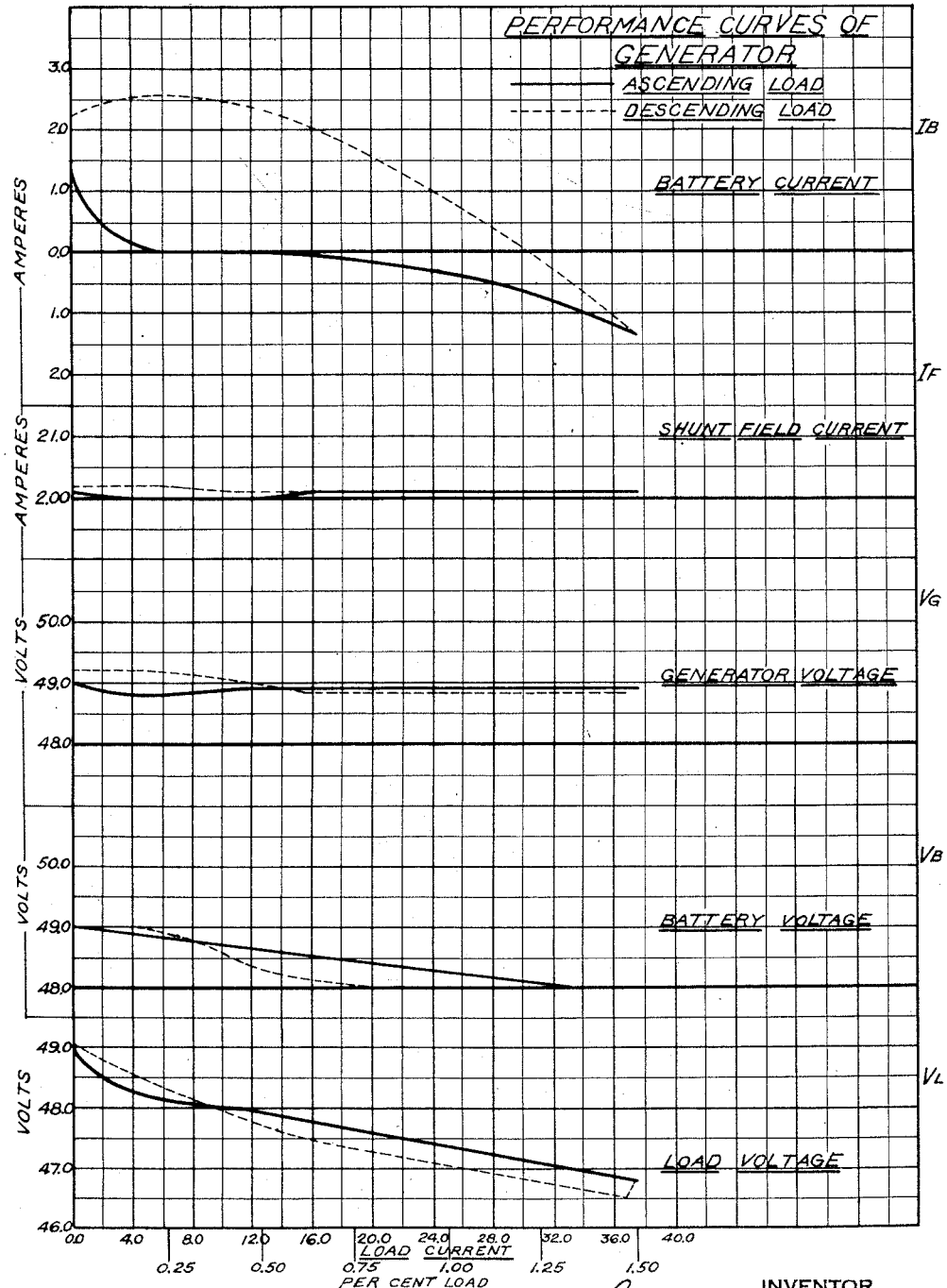
Fig. 4 is a set of curves showing the performance of my improved generator.

The performance characteristics are shown by the various curves in Fig. 4 of the drawings.

Existing generators may be reconstructed to this type of service by providing the desired shunt and series field coils where the magnetization curve possesses the proper characteristics. Where a modification of the magnetization characteristic is required the proper yoke and field coils may be substituted.

Having thus set forth the nature of my invention, what I claim is.

1. In a compound wound substantially constant speed generator, a magnetic circuit whose magnetization characteristic has the knee at the desired operating voltage, a shunt field coil, a series field coil in series with the armature and load to increase the flux to maintain the voltage substantially constant on increasing load, a second series field coil and a storage battery in series therewith connected across the armature and in series with the first series field coil and the load, said second series field coil being wound and connected to generate a magneto motive force to counteract the effect of the residual magnetism of the magnetic circuit persisting with decrease of load to maintain the voltage substantially constant, and all three coils being connected in the circuit under all conditions of load.

2. In a compound wound substantially constant speed generator, a magnetic circuit whose magnetization characteristic has the knee at the desired operating voltage. a shunt field coil, a storage battery having a substantially constant desired voltage, a series field coil in series with the load to maintain the voltage output substantially constant and substantially that of the battery on increasing load, a second series field coil in series with the battery and this coil and battery being connected across the armature and in series with the first series field coil and the load, and the second series field coil being wound and connected to generate a magneto motive force to counteract the effect of the residual magnetism of the magnetic circuit persisting with decreasing load to maintain the voltage substantially constant and substantially that of the desired voltage of the battery, and all three coils and battery being connected in the circuit under all conditions of load.

CHARLES H. PETERSON.